Nov. 20, 1945.  H. M. McCOY  2,389,161
CONTROLLABLE PITCH CHANGE MECHANISM FOR
DUAL ROTATION PROPELLERS
Filed Sept. 11, 1942   5 Sheets-Sheet 1

Fig. 1

INVENTOR
HOWARD M. McCOY
By
ATTORNEYS

Patented Nov. 20, 1945

2,389,161

UNITED STATES PATENT OFFICE 2,389,161

CONTROLLABLE PITCH CHANGE MECHANISM FOR DUAL ROTATION PROPELLERS

Howard M. McCoy, Fairfield, Ohio

Application September 11, 1942, Serial No. 458,039

14 Claims. (Cl. 170—135.6)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to dual-rotation propellers and more particularly to mechanism for controlling the pitch of the blades of both of the propellers simultaneously.

By "dual-rotation" is commonly meant a pair of oppositely rotating propellers operating in close tandem, mounted on concentric shafts and rotating at equal speeds.

Mechanism for accomplishing this purpose as heretofore proposed is complicated and costly, and it is therefore an object of this invention to provide a device which will have less parts and therefore be of lighter weight and greater simplicity.

It has been found that, in a device of this character, it is advantageous, in order to cancel propeller torque effects, to have an arbitrary and variable differential pitch setting between the front and rear propeller blades. For small angle pitch settings used at take-off and low forward velocities there should be but very little if any difference between the pitch of the front and the pitch of the rear blades. At high forward velocities there should be several degrees difference with the setting of the rear propeller lower than that of the front. It is desirable to have the pitch differential vary directly between the small differential at low velocities to the large differential at high velocities. It is therefore an object of this invention to so construct and arrange the mechanism that this advantage may be had.

Other objects and advantages will be disclosed as the invention is described in detail and reference is had to the drawings, wherein.

Figure 1:
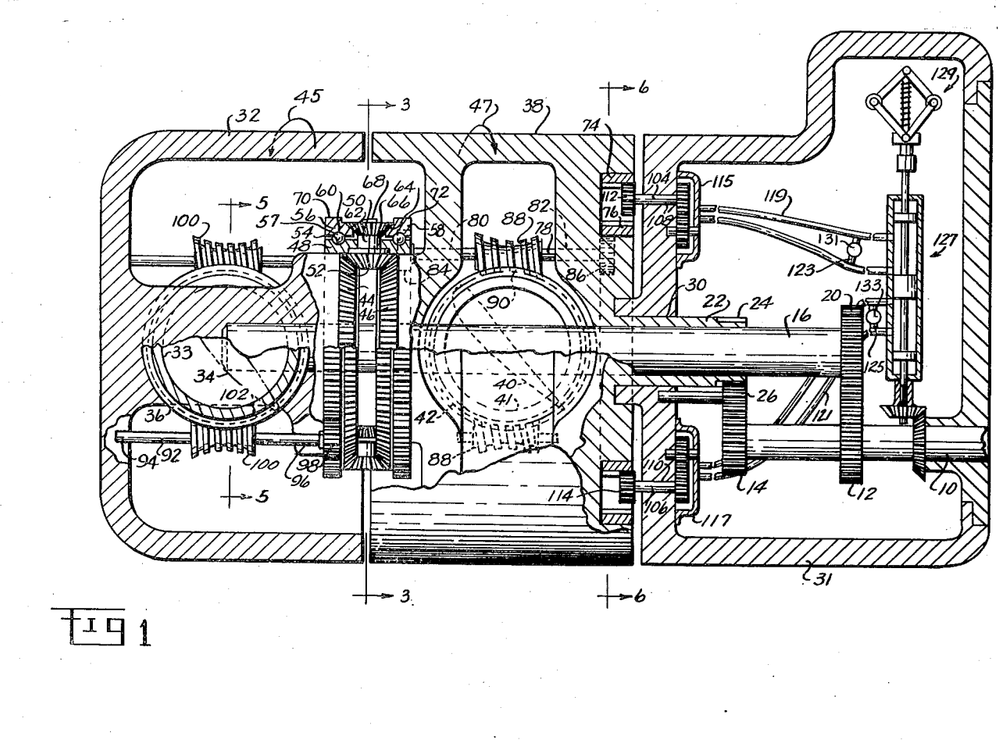
Fig. 1 is a more or less schematic view of a pitch-changing mechanism as applied to a dual-rotation propeller installation.

Referring more particularly to Fig. 1 an engine shaft 10 has affixed thereto two gears 12 and 14. A propeller shaft 16 is powered by the engine shaft through gears 12 and 20.

Freely rotatable on the propeller shaft 16 is a sleeve 22, this sleeve being powered by the engine shaft through gears 14 and 24, and an idler gear 26 which is inserted between gears 14 and 24, to cause reverse rotation of the sleeve with respect to the shaft. The ratio of the gears 12 and 20 equals the ratio of the gears 14, 24 and 26, whereby the shaft 16 and sleeve 22 rotate at equal speeds. The shaft 16 is rotatable in the sleeve 22 and the sleeve is rotatable in a bearing 30 of the casing 31.

Drivably affixed to the front end of the shaft 16 is the front propeller hub 32. Hub 32 carries the blades 34 which have their roots 33 rotatable in combination thrust and radial bearings 36. Bearings 36 extend laterally from the front hub 32 and are conventionally contained therein.

Drivably affixed to the front end of the sleeve 22 is the rear propeller hub 38. Hub 38 carries the blades 40 which have their roots 41 rotatable in combination thrust and radial bearings 42. Bearings 42 extend laterally from the rear hub 38 and are conventionally contained therein. The section of Fig. 1 is so broken that the blade 34 which is shown is that one which extends from the hub toward the observer and is therefore shown in phantom, while the blade 40 is that one which extends from the hub away from the observer and is therefore shown in dotted outline.

Coaxially adjacent bevel gears 44 and 46 are drivably secured to the hub 32 and hub 38 respectively, whereby the front propeller hub 32, the shaft 16 and the bevel gear 44 are permanently joined for unitary rotation, rotation preferably being in the direction of the arrow 45. The rear propeller hub 38, the sleeve 22 and the bevel gear 46 are also joined together to rotate as one part, but, due to the inclusion of the idler gear 26, are caused to rotate in the opposite direction, i. e. in the direction of the arrow 47.

Figures 3, 4, 7, 8, 9:
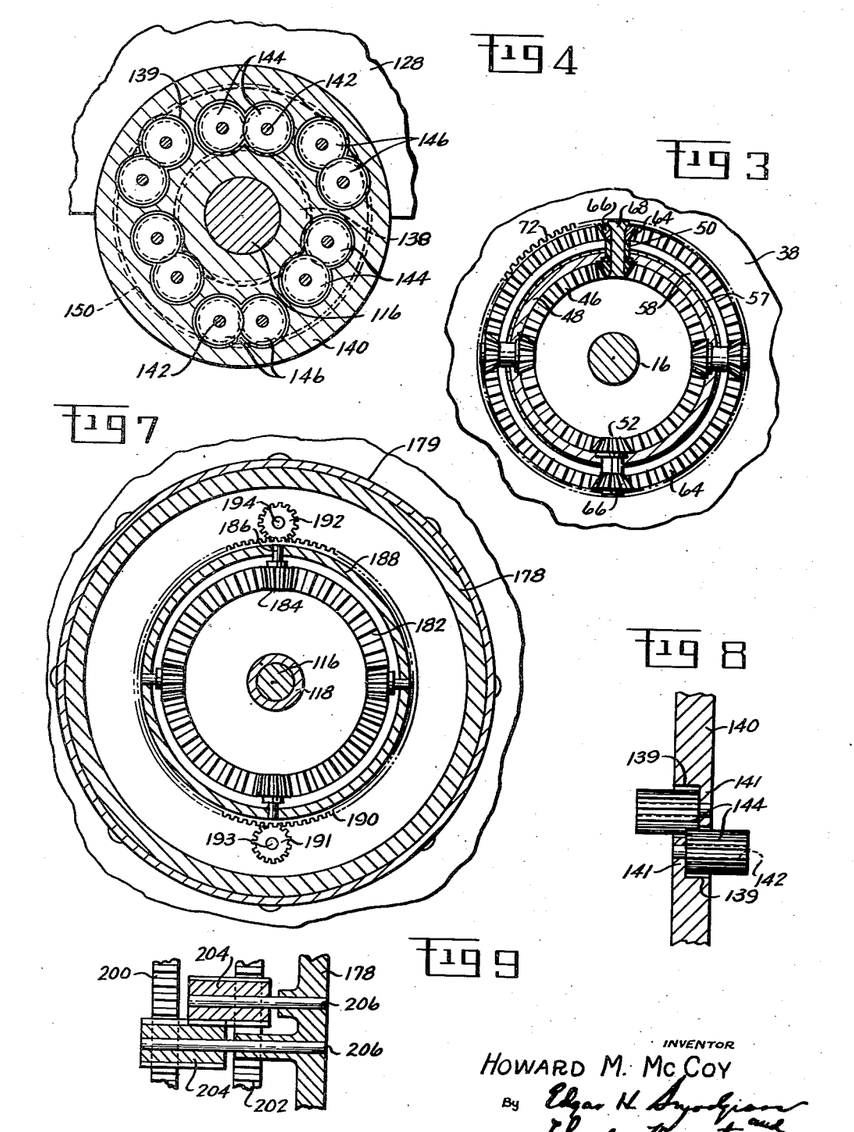
Fig. 3 is a transverse section taken at 3—3 of Fig. 1 through the pinion carrier and pinions.
Fig. 4 is a transverse section taken at 4—4 of Fig. 2 through the pinion carrier and pinions.
Fig. 7 is a transverse section, taken at 7—7 of Fig. 2 through the modified form of control gearing.
Fig. 8 is a fragmentary section taken at 8—8 of Fig. 2 through the pinions of the carrier gearing.
Fig. 9 is a fragmentary section, taken at 9—9 of Fig. 2 through the reversing pinions of the control gearing.
Figure 5:
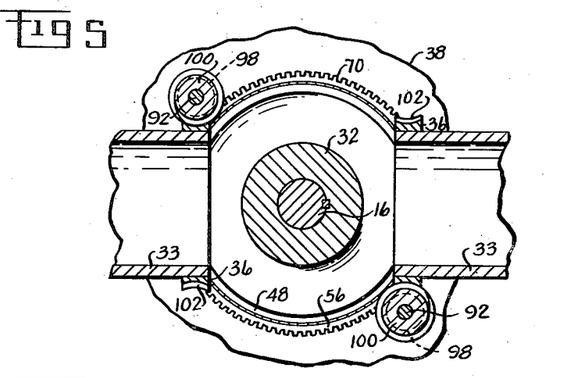
Fig. 5 is a transverse section taken at 5—5 of Fig. 1 through the pitch-changing gearing of one propeller.

A bevel pinion carrier ring 48 surrounds the bevel gears 44 and 46, the ring being provided, at circumferentially spaced intervals, with radially extending studs 50 which may preferably be pressed fitted or otherwise fixed in the ring. Bevel pinions 52 are freely rotatable on the inner ends of the studs 50, the pinions being so held by the studs as to be properly meshed with both bevel gears 44 and 46. Obviously, with the two bevel gears 44 and 46 rotating oppositely at the same speed, the bevel pinions 52, studs 50 and carrier ring 48 are held as a unit against rotation about the axis of the shaft 16 and sleeve 22. It should be noted that, with rotating parts completely surrounding it, there is no nonrotative part to which the carrier ring 48 could be attached to hold it against rotation. The gearing 44, 46 and 52, which together hold the carrier ring 48 nonrotative, may conveniently be referred to as the carrier retaining gears.

Formed in the periphery of the carrier ring 48 are two axially spaced apart ball races 54. Surrounding the ring 48 are separate rings 56 and 58, each of which has a complementary ball race 60 formed in its inner surface. With balls 57 properly placed in the races 54 and 60 the rings 56 and 58 are concentrically supported on and freely rotatable about the nonrotatable ring 48. Rings 56 and 58 have integral bevel gears 62 and 64 formed on their interfacing edges, and bevel pinions 66 are in mesh with both bevel gears 62 and 64, these pinions being each rotatable on an outwardly projecting portion 68 of a stud 50, whereby, when one of the rings 56 or 58 rotates in one direction, the other must rotate in the opposite direction, or. to put it another way, when the ring 56 rotates in unison with the front hub 32, the ring 58 must rotate in unison with the rear hub 38. In addition to the bevel gears 62 and 64, the external spur gears 70 and 72 are formed respectively on the peripheries of rings 56 and 58. Since the gears 62, 64, 66, 70 and 72 together provide a means of connecting the two sets of propeller gears so that one may not change pitch without changing the pitch of the other, these gears may preferably be called the pitch-change connecting gears.

It should here be noted that the statement that the carrier is nonrotative is true only if the hubs 32 and 38 rotate oppositely at equal speeds and the gears 44 and 46 have exactly the same number of teeth.

If the hubs 32 and 38 rotate at different speeds, the carrier also will rotate, its rotations being the algebraic sum of the rotations of the two hubs. But this will cause no pitch change in the propeller blades for the reason that the rotations of the carrier relate back to the gears 56 and 58, leaving each rotate in unison with its hub 32 or 38.

Similarly, with equal propeller speeds, it may be found effective to break up vibrations to make a difference of one or two teeth between gears 44 and 46, in which case the carrier would rotate slowly, then if the same difference was provided between the teeth of gears 56 and 58, no pitch change would occur, because gears 56 and 58 would then rotate in unison each with its hub.

Figure 6:
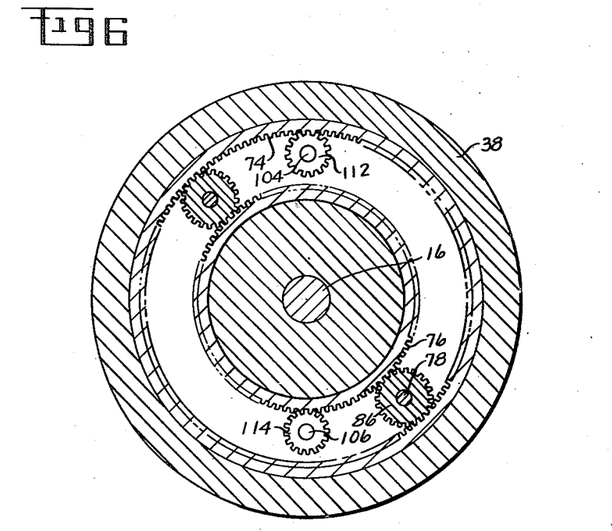
Fig. 6 is a transverse section taken at 6—6 of Fig. 1, through the control gearing.

Rotatable on bearing surfaces formed in the rear end of the rear hub 34 are an internally toothed ring gear 74 and an externally toothed ring gear 76. The worm shafts 78 are each rotatable in bearings 80 and 82 formed in the rear propeller hub 38, each shaft carrying, at one end, a pinion 84 which is meshed with the external spur gear 72, and at the other end a pinion 86 which is meshed with both the internally toothed ring gear 74 and the externally toothed ring gear 76 (see Fig. 6). Intermediate of the ends, the shafts 78 each carry a worm 88 which is meshed with a worm wheel 90. The worm wheels 90 are secured to the roots 41 of the blades 40. The ring gears 74 and 76 may conveniently be referred to as the control gears since when either is retarded the pinion 86 reacts on the retarded gear to turn the pitch-changing gearing 88—90 and 100—102.

A second pair of worm shafts 92 are each rotatable in bearings 94 and 96, formed in the front propeller hub 32, each shaft carrying, at one end, a pinion 98 which is meshed with the external spur gear 70. Intermediate of the ends, the shafts 92 each carry a worm 100 which is meshed with a worm wheel 102 carried on the inner ends of the roots 33 of the blades 34.

Obviously, as long as the ring gears 74 and 76 both rotate in perfect unison with the rear hub 38, no rotation of the shafts 78 in their bearings 80 and 82 may take place, although they will revolve about the axis of the propeller shaft 16, and the ring 58 will be rotated in unison with the rear hub 38, the ring being dragged around by the nonrotating pinion 84 which is meshed with the spur gear teeth 72.

Since the ring 56 is connected to the ring 58 through the bevel pinions 66, the ring 56 must rotate oppositely at the same speed and will therefore be rotating in unison with the front hub 32. Neither of the worms 88 or 100 rotate relative to their respective worm wheels 90 or 102 and no pitch change of the blades of either propeller can take place.

However, should one of the ring gears 74 or 76 be held against rotation, or be retarded in its rotation with respect to the rear hub 38, the shafts 78 will be rotated in their bearings in one direction and, since driving through the bevel pinions 66 reverses the direction, the shafts 92 will be rotated in their bearings in the other direction, the rotation of these shafts being operative to turn the worms 88 and 100 and their respective wheels 90 and 102 to respectively change the pitch of the blades 40 and 34. Pitch change may therefore be made in the blades of the front and rear propellers simultaneously in one or the other direction by braking one or the other of the ring gears 74 or 76. By making the worm gear sets 88—90 and the worm gear sets 100—102 all right-hand, the retarding of the internal ring gear 74 will decrease the pitch of both propellers, while the retarding of the external gear 76 will increase their pitch. To facilitate description, the group of gears 84, 86, 88 and 90, as well as the group 98, 100 and 102, may hereinafter be referred to as the pitch-changing gears. While any form of brake will operate to change the pitch, a specific example is included in order to show a complete operative structure.

The hydraulic braking mechanism shown is of the type wherein gear or vane pumps are driven against substantially zero head by the members which are to be braked, with means for restricting one or the other pump outlet and thus increasing the head or resistance against which that pump operates until the torque of the member driving the pump is overcome and it is retarded or stopped.

It will, of course, be understood that the pump braking torque on one ring gear is equal to the resistance of the propellers to pitch increase, while the pump braking torque on the other ring gear is equal to the resistance of the propellers to pitch decrease. This latter is a relatively small torque because of the natural depitching tendency of the blades, due to the negative centrifugal pitch moments. The pumps must therefore have braking capacity to overcome this resistance. Since the internally toothed ring gear 74 is of larger pitch diameter than the externally toothed ring gear 76, it follows that the speed of pitch change, in the structure shown in Fig. 1, may ordinarily be faster in one direction than in the other. It may, however, be made approximately equal by proper selection of gears and pump capacities.

The pump driving shafts 104 and 106 are rotatable in bearings 108 and 110 in the casing 31, and are so positioned in the casing that the pinion 112, which is secured to the end of the shaft 104, is in mesh with the internal ring gear 74, and so that the pinion 114, which is secured to the end of the shaft 106, is in mesh with the external ring gear 76.

The pumps 115 and 117 are of conventional type, and are arranged to pump through continuous circuits 119 and 121 which may be closed or restricted, each by one or more valves. In the embodiment shown, a single plunger valve 127 controls both circuits, and an engine-driven centrifugal governor 129 controls the plunger valve, the valve being brought to a central or neutral position by the governor when the governor is being rotated at the desired speed, and in this neutral position both pump circuits are open and no change in pitch is therefore being effected. Adjustment of the governor spring tension to obtain variable governing speeds may be made in the conventional manner.

Overspeed of the engine-driven governor 129 will, of course, close or partly close the circuit 119 which will retard the pump 115 which will in turn retard the internally toothed ring gear 74. Any reduction in speed of the ring gear 74 below that of the hub 38 will roll the pinion 86 and worm 88 rearwardly with respect to the hub 38 (clockwise viewed from the right) which, through the gearing 84, 72, 64, 66, 62 and 70, will turn the pinion 98 and worm 100 forwardly with respect to the hub 32 (anticlockwise viewed from the right), whereby the pitch of the blades of both propellers will be increased, and the engine thereby brought back to the selected speed.

Conversely, underspeed of the engine will close or partially close the circuit 121 which will retard the pump 117, which will in turn retard the externally toothed ring gear 76. Any reduction in speed of the ring gear 76 below that of the hub 38 will roll the pinion 86 and worm 88 forwardly with respect to the hub 38 (anticlockwise viewed from the right) which, through the same gearing 84, 72, 64, 66, 62 and 70, will turn the pinion 98 and worm 100 rearwardly with respect to the hub 32 (clockwise viewed from the right), whereby the pitch of the blades of both propellers will be decreased, and the engine thereby brought back up to the selected speed. Bypass channels 123 and 125 having relief valves 131 and 133 are provided in the circuits 119 and 121 for relieving the circuits of excess pressure which may result from a complete closing of either of them by the valve 127.

As hereinbefore discussed, due to the influence of the front propeller slip stream on the rear propeller, it has been found advantageous in order to negate the torque between the two propellers to alter the pitch of one propeller at a higher ratio than the other, that is, with a given loss in rotation of the ring gear 74 with respect to the hub 38, the pitch of the front propeller should normally be slightly greater than the rear. This is readily accomplished in the mechanism herein disclosed by so designing the gearing that there is a difference of one or more teeth between gears 70 and 72 or if so desired the same result may be achieved by making a difference of one or more teeth between worm wheels 90 and 102.

Figure 2:
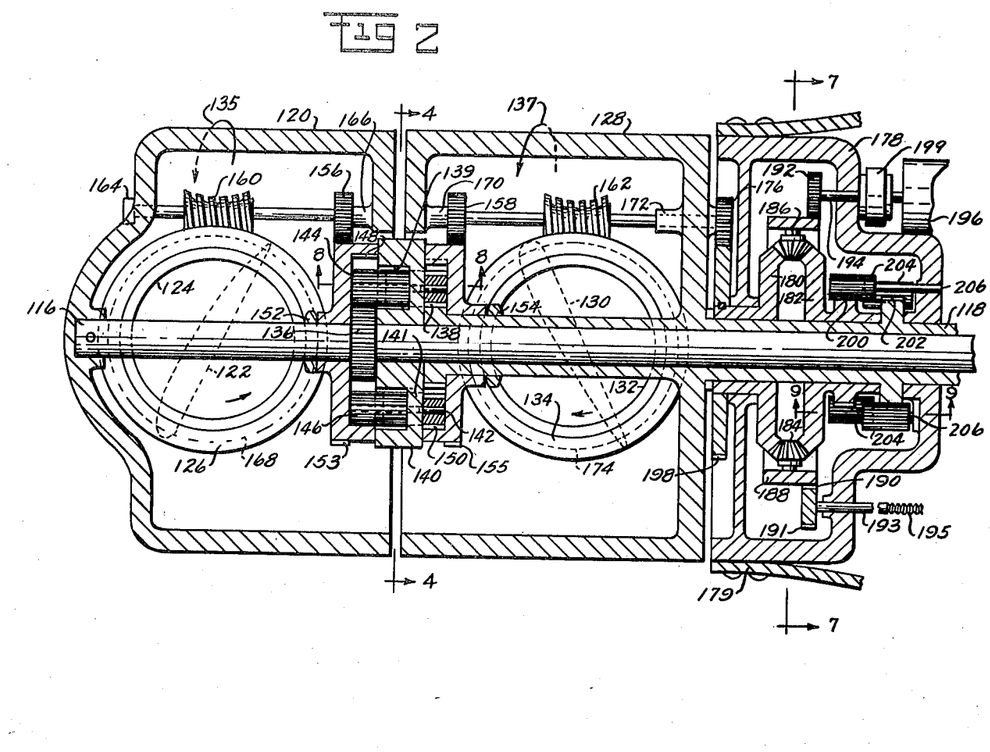
Fig. 2 is a view similar to Fig. 1, but with a different type of gearing.

While the modification shown in Fig. 2 is substantially the same in function, it differs considerably from that shown in Fig. 1 in structural details, the carrier retaining gears and the propeller connecting gears being spur instead of bevel, and the pitch-changing mechanism being operated by a reversible electric motor instead of braking one or the other of a pair of reaction gears for this purpose.

The propeller shaft 116 and the propeller sleeve 118 rotate oppositely. The means for causing opposite rotation is not shown, but it may comprise an arrangement of gears such as 12, 14, 20, 24 and 26 of Fig. 1.

Affixed to the front end of the shaft 116 is the front propeller hub 120. Hub 120 carries the blades 122 which have their roots 124 rotatable in combined thrust and radial bearings 126. Bearings 126 extend laterally from the front hub 120 and are conventionally contained therein.

Affixed to the sleeve 118 is the rear propeller hub 128. Hub 128 carries the blades 130 which have their roots 132 rotatable in combined thrust and radial bearings 134. Bearings 134 extend laterally from the rear hub 128 and are conventionally contained therein.

Coaxial spur gears 136 and 138 are affixed to the shaft 116 and sleeve 118 respectively, whereby the front propeller hub 120, shaft 116 and gear 136 rotate in unison, preferably in the direction of the arrow 135. The rear propeller hub 128, sleeve 118 and gear 138 are also joined for unitary rotation, but due to the fact that the sleeve may be driven through an idler gear (not shown) the rear hub and its associated parts may rotate oppositely from those of the front hub, preferably at equal speeds, and preferably in the direction of the arrow 137.

A pinion carrier 140 consists of a relatively thick disc placed between externally toothed gears 136 and 138 and rotatably carried on the shaft 116 of any other suitable bearing support which is concentric with the axis of rotation.

Pairs of cup-shaped pockets 139 are formed in the faces of the carrier disc 140 for planet pinions (see Figs. 4 and 8), each pocket having sufficient thickness 141 left at the bottom to support a stud 142 upon which the pinion may rotate. The two pockets of a pair are formed in the disc on opposite sides thereof and at such distance apart that the pockets of a pair run into each other and the pinions of a pair are in mesh one with the other (see Fig. 8). The pinions are of wide enough face to overlap each other in driving relation and also extend from the pockets in the disc to overlap the faces of the gears 136 and 138.

Six pairs of pinions will provide a satisfactory arrangement, three pairs 144 being radially positioned to mesh with the gears 136 and 138, and the other three pairs 146 being radially further from the axis of rotation so as to be out of mesh with the gears 136 and 138 but in mesh with two internally toothed gears 148 and 150 which enclose the gears 136, 138 and pinions 144 and 146. The internally toothed gears 148 and 150 are free to rotate on the shaft 116 and sleeve 118 respectively. Collars 152 and 154 hold the internal gears against axial displacement.

Obviously, when gears 136 and 138, Fig. 2, are compelled by means such as the gearing 12, 20, 14, 24, 26 of Fig. 1 to rotate oppositely, the carrier 140 and its pinions 144, 146 will be nonrotative with respect to the axis, and, with the carrier nonrotative with respect to the axis, the rotation of one of the internally toothed gears 148 or 150 will rotate the other oppositely, that is, when the ring gear 148 rotates in unison with the front hub 120, the ring gear 150 rotates in unison with the rear hub 128, and this condition maintains except when pitch changing is being effected.

The statement that the carrier 140 will be nonrotative is, as has already been explained relative to Fig. 1, based on the assumption that the two hubs 120 and 128 rotate oppositely at the same speed and that the internal gears 148 and 150 have the same number of teeth. Where there is a difference between the speeds of the two hubs 120 and 128 or in the number of teeth in gears 136—138 and in 148—150 the carrier will rotate slightly without, however, affecting the pitch change.

For effecting pitch changes, externally toothed gears 153 and 155 are formed on the peripheries of the gears 148 and 150. Gears 153 and 155 are in mesh with two pinions 156 and two pinions 158 which are secured to or integral with the righthand worms 160 and 162.

Worms 160 have rotative bearing in bearing bosses 164 and 166 and are meshed with worm wheels 168 on the inner ends of the front propeller blade roots, while worms 162 have rotative bearing in bearing bosses 170 and 172 and are meshed with worm wheels 174 on the inner ends of the rear propeller blade roots. The shaft of the worm 162 extends through the rear wall of the propeller hub 128 and has attached to its rear end, the pinion 176. As long as the pinion 176 revolves about the axis of the shaft 116 without rotating on its own axis, no change in propeller pitch will take place. But when pinion 176 rotates on its own axis, forward or backward, whether or not it revolves about the axis of the shaft 116, a change in propeller pitch will take place. The mechanism for rotating the pinion 176 on its own axis, whether or not it is at the time revolving about the axis of the shaft 116, is shown in the stationary casing 178 which is normally attached to a part of the engine nose as at 179.

Within the casing 178 and freely rotatable on the tube 118 are a pair of bevel gears 180 and 182 operatively connected together by bevel pinions 184. Pinions 184 are rotatably mounted on studs 186 which are circumferentially spaced apart in a ring 188. The ring 188 has an external gear 190 formed about its periphery. A pinion 192 meshes with gear 190, the shaft 194 of the pinion having rotative bearing in the rear wall of the casing 178. A reversible motor 196, including sufficient additional reduction gearing, is provided for rotating the shaft 194 forwardly or rearwardly as desired. A brake, 199, preferably spring applied, is provided for holding the motor nonrotative when no current is passing through it, a solenoid brake release means being connected in the motor circuit to release the brake simultaneously with the starting of the motor.

A large spur gear 198 in mesh with pinion 176 is integral with, or attached to, the bevel gear 180, whereby, when the pinion 176 drags the gear 198 around with it by revolving around the axis of shaft 116 without rotating on its own axis, the bevel gear 180 will revolve one turn for each turn of the hub 128. In order then to allow the bevel pinion 184 to rotate on its own shaft 186 without revolving around the axis of the shaft 116, the bevel gear 182 must be rotated oppositely from the bevel gear 180 and at the same speed. To provide this opposite rotation, the bevel gear 182 has attached thereto, or integral therewith, a spur gear 200, while the tube 118 carries a similar spur gear 202, these gears being connected by pairs of overlapping pinions 204 idling on studs 206 extending from the rear wall of the casing 178.

Because of the pairs of overlapping pinions 204, the gear 202 drives the spur gear 200 and the bevel gear 182 backwardly while the bevel gear 180 rotates at the same speed forwardly, the bevel pinions being rotated on their own axes but not revolved around the axis of shaft 116. Under this condition there is substantially no effort to turn the motor 196 either direction. Conversely, the pinion 176 whose rotation on its own axis is responsible for propeller blade angle adjustment, will rotate on its own axis, in one or the other direction, whenever the motor 196 rotates and not otherwise, whereby blade adjustment takes place by motor rotation irrespective of whether the hubs 120 and 128 are rotating or are stationary. In this respect it differs from the structure shown in Fig. 1, the braking means of which is operative only to effect blade adjustment when the propellers are under rotation, no means being provided in the structure of Fig. 1 for changing pitch when the propellers are not rotating. To provide such a means for the structure of Fig. 1, the pinion 192 of Fig. 2 could be meshed with either of the ring gears 74 or 76 of Fig. 1, with the exception that element 199 would additionally have incorporated therein a solenoid-energized clutch to release the motor 196 from engagement with shaft 194 when the shaft was being turned otherwise than by the motor.

Figure 10:
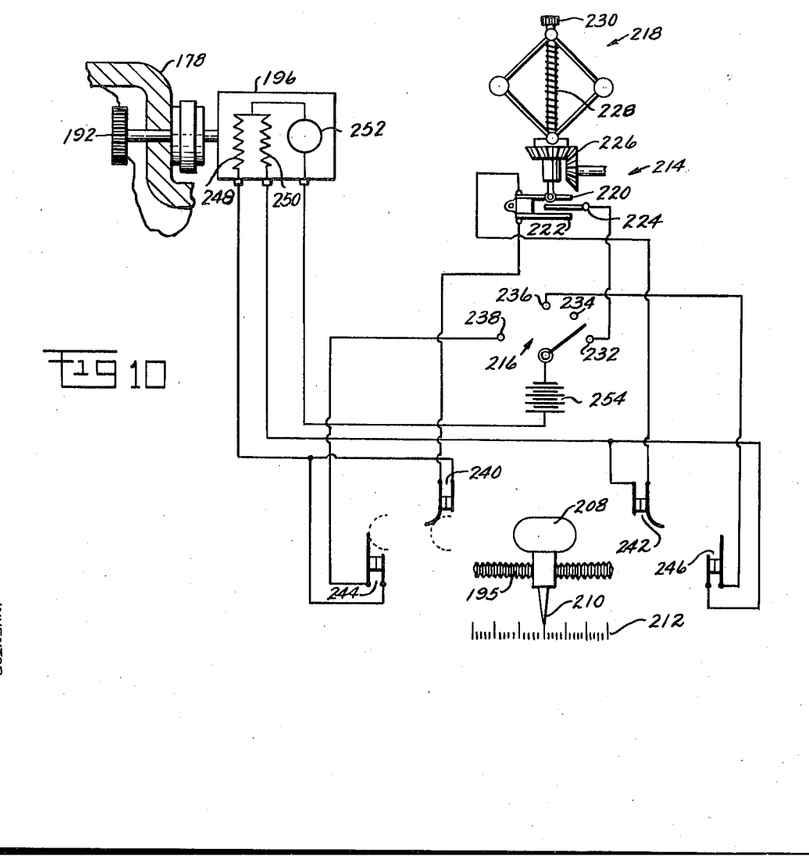
Fig. 10 shows a pitch indicator mechanism, pitch limit switches, and electric control means, all applicable to the structure shown in Fig. 2.

The switch mechanism for operating the motor 196 in either direction may consist of a two-position switch operable manually or by conventional governing means as is now common practice, or a combined manual and automatic control for the motor 196 may be provided as shown in Fig. 10 which includes switches for limiting the extent of pitch change either in manual or in automatic control, together with pitch-indicating mechanism.

To apply the control means of Fig. 10 to the device shown in Fig. 2, a pinion 191, Fig. 2, is meshed with the gear 190, the pinion shaft 193 having rotative bearing in the rear wall of the casing 178, a portion of the shaft which extends rearwardly from the casing being provided with threads 195 (see Fig. 10).

Since the number of turns which the motor 196 has made clockwise or anticlockwise from a neutral position (viewed from the right) determines the extent of pitch decrease or increase respectively of the propellers, it follows that the turns which the screw 195 makes clockwise or anticlockwise from the neutral position is a function of the pitch. Pitch-indicating mechanism is therefore readily provided, a simple means consisting of a carriage 208, internally threaded to fit the screw 195, which may have a pointer 210 integral, with pitch indicia 212 adjacent, but may preferably have some form of indicator located more conveniently for the pilot, operative by flexible shaft or other power transmission from the screw 195.

A centrifugally operative electric switch 214 is provided for controlling the motor 196 and thereby controlling the pitch of the propeller blades automatically as the speed of the propellers rise or fall. The arrangement also includes an electric switch 216 for operation of the motor in one or the other direction for changing the pitch of the propellers manually.

In the arrangement shown, a flyball governor 218 is provided for operating the switch 214, the governor being operative upon a change in speed from a selected normal to move the two insulatedly spaced-apart contact members 220 and 222 upward or downward into engagement with an intermediate stationary contact member 224. The governor may be driven by the aircraft engine through gearing 226. The flyballs are held against the action of centrifugal force by a spring 228 which may be adjusted by the screw 230 or by some remote control for altering the selected normal. The arrangement of the flyballs is such that an increase in rotative speed lowers the contact 220 into engagement with the contact 224 while a decrease in speed raises the contact 222 into engagement with the contact 224.

The manually operable switch 216 is closable on a contact 232 to provide a circuit for automatic operation of the motor 196, to an "off" position 234, on a contact 236 for manually increasing the propeller pitch, and on a contact 238 for manually decreasing the propeller pitch. Control is through the reversible motor 196 whether it is by manual or by automatic switch means.

The pitch indicator carriage 208 is so formed and positioned that its movement on the screw 195 will operate a pair of electric switches 240 and 242 for limiting the degree of propeller pitch adjustment which may be effected by automatic operation and a second pair 244 and 246 for limiting the degree of propeller pitch adjustment which may be effected by manual operation. The switches 240, 242, 244 and 246 are placed in the line of travel of the carriage 208 so as to be opened thereby.

The electric motor 196 is reversible because of the inclusion of field windings 248 and 250 of opposite polarity, the coil 248 being employed for rotation in one direction and the coil 250 for rotation in the other direction, the direction of the current in the armature circuit 252 remaining the same in both cases.

If the circuits are wired as in Fig. 10 and the manual switch 216 is closed on the automatic contact 232, alternate circuits will be made upon change in governor speed, one from a battery 254 through switch 216, contacts 224 and 220, limit switch 242, field coil 250, armature 252 and back to the battery, the other from battery 254 through switch 216, contact 224 and 222, limit switch 240, field coil 248, armature 252 and back to the battery.

Current, therefore, when directed by the governor 218 through the one circuit, operates the motor 196 in one direction for pitch increase, and, when directed through the other circuit, operates the motor in the other direction for pitch decrease. The object of increasing or decreasing the propeller pitch is, of course, to cause the engine to respectively decrease or increase its speed, and if at any time the engine is far enough under speed to cause the governor 218 to close the contacts 224—222 for pitch decrease, and if for any reason the engine fails to respond and increase its speed upon continued decrease in propeller pitch, and operation of the electric motor 196 therefore continues in the direction which decreases the pitch until the pitch indicator carriage 208 opens the limit switch 240, the electric circuit will be broken, whereupon pitch decrease will stop at the predetermined minimum pitch point for which the limit switch 240 has been set, which, for example, may preferably be about fifteen degrees from zero pitch, and automatic pitch-change operation will not thereafter be resumed until the engine does regain sufficient speed to cause the governor 218 to close the contacts 220—224, thereby completing a circuit through the still-closed bomb switch 242 which operates the motor 196 to again increase the pitch.

On the other hand, if the engine is sufficiently overspeed to have closed the contacts 220—224 for pitch increase, and if for any reason the engine fails to decrease its speed upon continued increase in propeller pitch, and operation of the electric motor 196 therefore continues in the direction which increases the pitch until the pitch indicator carriage 208 opens the limit switch 242, the electric circuit will be broken, whereupon pitch increase will stop at the predetermined maximum pitch point for which the limit switch 242 has been set, which, for example, may be about fifty-five degrees from zero pitch, and automatic pitch change operation will not thereafter be resumed until the engine does lose sufficient speed to cause the governor 218 to close the contacts 222—224, thereby completing a circuit through the still-closed limit switch 240 which operates the electric motor to again decrease propeller pitch.

The automatic pitch-change mechanism above described is concerned only with such changes in propeller pitch as may be required to maintain a constant engine speed, the more extensive changes in pitch, i. e., the feathering and the braking positions, being effected by means of the manual switch 216.

Where feathering becomes advisable, as where one of a group of engines of a large craft becomes incapacitated or jammed, the manual switch 216 is closed on to the contact point 236 for increased pitch, and left closed until the pitch-change carriage 208 opens the switch 246, which may preferably be when the pitch approaches ninety degrees above zero.

For propeller braking, the manual switch 216 is closed on to the contact point 238 for decreased pitch and usually left closed until the pitch-change carriage 208 opens the switch 244 which may preferably be when the pitch is about minus twenty-five degrees.

The combination of automatic and manual control system has the further advantage that at any time the operator may shift out of automatic control by moving the switch 216 from the automatic position 232 to the off position 234 and the pitch will be fixed at the angle shown by the pitch indicator at the time of the shift. The operator may henceforth control the pitch setting manually by momentarily holding the switch 216 closed on one or the other of the points 236 or 238 as the case may require, the pitch indicator showing him the degree of pitch change being effected, and the switches 244 and 246 being operative to stop pitch change if the switch is held closed for too long a period. The mechanical stops of common practice used for limiting pitch change may supplement the limit switches as an added safety feature inasmuch as no damage can result from turning the blades to a positive stop, since the relief valves 84—86 of Fig. 2 will yield when a preselected effort is exerted at turning the propeller blades.

Since it is desirable to provide a slightly higher pitch-change ratio in one propeller than in the other, the ratio of the pitch-changing gearing on one side of the carrier 140 may preferably be made slightly different from that on the other side as explained relative to Fig. 1.

Having described several embodiments of my invention, I claim:

1. In a dual-rotation propeller mechanism having two adjacent concentric tandem contra-rotating propeller hubs with a plurality of propeller blades in each hub having their roots rotatable in bearings in the hubs, mechanism for simultaneously rotating the roots to alter the pitch of the blades, said mechanism comprising a pair of axially spaced gears, one secured to each hub for unitary rotation therewith, a second pair of axially spaced gears surrounding the fist pair of gears, a pinion carrier between the two gears of the first said pair of gears, reversing pinion means on said carrier connecting the two gears of each pair of gears, whereby, when one gear of the first pair rotates opposite the other, the carrier will be held against free rotation, and when one gear of the second pair rotates in one direction, the other one of the pair will rotate oppositely, irrespective of the rotation of the first pair, a set of normally nonrotating pitch-changing gearing in each hub, each set including a gear on each root, said sets operatively connecting the axially spaced gears of the second pair to the blades of the propellers, whereby the pitch of both propellers is changed simultaneously, and means for rotating the pitch-changing gearing which includes a third pair of axially spaced gears, gearing connecting one of the gears of the third pair to one of the sets of normally non-rotative pitch-changing gearing, whereby said one gear of the third pair is rotated in rear propeller direction at propeller speed, reversing gearing connecting the other one of the gears of the third pair to the rear propeller hub, whereby the two gears of the third set rotate oppositely, a second pinion carrier intermediate the gears of the third pair, reversing pinion means on said carrier connecting the two spaced gears of the third pair whereby the oppositely rotating gears of the pair cause said second carrier to remain non-rotative, a power source, and gearing connecting said second carrier and said power source.

2. In an aircraft propeller mechanism having two adjacent, coaxial, tandem, contrarotating, propeller hubs with a plurality of propeller blades in each hub having their roots rotatable in bearings in said hubs, mechanism for simultaneously rotating the roots to alter the pitch of the blades, said mechanism comprising a pair of external spur gears slightly spaced apart axially, one secured to each said hub for unitary rotation therewith, a pair of internal spur gears surrounding the said external gears, a pinion carrier between the two said pairs of gears, a pair of pinions mounted on, and rotatable about their axes on, said carrier, a portion of the faces of said pinions being overlapped and intermeshed in driving relation one with the other, the remaining portions being extended axially and intermeshed, one with each external gear, a second pair of pinions constructed and mounted substantially like the first said set except that their extended ends are intermeshed, one with each internal gear, a gear train connecting each internal gear to a propeller blade, and means for applying rotation to one of said trains.

3. In an aircraft propeller mechanism having two adjacent, coaxial, tandem, contrarotating, propeller hubs with a plurality of propeller blades in each hub having their roots rotatable in bearings in said hubs, mechanism for simultaneously rotating the roots to alter the pitch of the blades, said mechanism comprising an external spur gear on each hub secured to rotate therewith, a concentric internal spur gear freely rotatable about each external spur gear, one external spur gear and one internal spur gear constituting a pair of gears, a pinion carrier between said pairs of gears, a pair of spur pinions rotatable about their axes on said carrier, a portion of the faces of said spur pinions overlapping and meshing with each other, the remaining portions being extended laterally beyond the carrier and meshed, one with each external spur gear, a second pair of spur pinions substantially like the first except located radially further from the propeller axis on the carrier and meshed one with each of said internal spur gears, and a rotation-transmitting means operatively connecting said internal spur gears to the roots of said blades.

4. In an aircraft propeller structure wherein a propeller hub has a plurality of propeller blades with their roots rotatable in bearings in said hub, and gear trains normally nonrotative with respect to said hub for simultaneously rotating said roots, mechanism for operating said gear trains which comprises a pair of axially spaced gears both coaxial with said hub, gearing connecting one of the said coaxial gears to the normally non-rotating gears of said gear trains, gearing including a reverse idler pinion set connecting the other of said coaxial gears to the propeller hub, whereby the two coaxial axially spaced gears rotate oppositely, a carrier intermediate said gears and coaxial with said hub, reverse idler pinions on said carrier in mesh with both said coaxial gears, and a reversible power means connected to said carrier to rotate said carrier.

5. In an aircraft propeller structure wherein a propeller hub has a plurality of propeller blades with their roots rotatable in bearings in said hub, and gear trains in said hub, normally nonrotative with respect to said hub for simultaneously rotating said roots, mechanism for operating said gear trains which comprises a pair of axially spaced gears both coaxial with said hub, gearing connecting one of said coaxial gears to the normally nonrotating gears of said gear trains, gearing including a reverse idler pinion set connecting the other of said coaxial gears to the propeller hub, whereby the two coaxial axially spaced gears rotate oppositely, a carrier intermediate said gears and coaxial with said hub, reversing idler pinions on said carrier in mesh with both said coaxial gears, a reversible electric motor connected to said carrier to rotate said carrier, a screw adapted to be rotated by rotation of said carrier, and a pitch-indicating carriage internally threaded to fit the threads of said screw.

6. In an aircraft propeller structure wherein a propeller hub has a plurality of propeller blades with their roots rotatable in bearings in said hub, and gears trains in said hub, normally nonrotative with respect to said hub for simultaneously rotating said roots, mechanism for operating said gear trains which comprises a pair of axially spaced gears both coaxial with said hub, gearing connecting one of said coaxial gears to the normally nonrotating gears of said gear trains, gearing including a reverse idler pinion set connecting the other of said coaxial gears to the propeller hub, whereby the axially spaced coaxial gears rotate oppositely, a carrier intermediate said gears and coaxial with said hub, reversing idler pinions on said carrier in mesh with both said coaxial gears, a reversible electric motor connected to said carrier to rotate said carrier, and a speed-responsive reversing switch for operating said motor in one or the other direction as the speed of the propeller rises or falls.

7. In an aircraft propeller structure wherein a propeller hub has a plurality of propeller blades with their roots rotatable in bearings in said hub, and gear trains in said hub, normally nonrotative with respect to said hub for simultaneously rotating said roots, mechanism for operating said gear trains which comprises a pair of axially spaced gears coaxial with said hub, gearing connecting one of said coaxial gears to the normally nonrotating gears of said gear trains, gearing including a reverse idler pinion set connecting the other of said coaxial gears to the propeller hub, whereby the two coaxial axially spaced gears rotate oppositely, a carrier intermediate said gears and coaxial with said hub, reversing idler pinions on said carrier in mesh with both said coaxial gears, a reversible electric motor connected to said carrier to rotate said carrier, said motor having alternate circuits for changing its direction of rotation, a speed-responsive electric switch having a current supply contact and a contact in communication with each motor circuit alternately engageable with the supply contact as the propeller speed rises or falls, a current source, and a manual switch for selectively directing current from said source to said supply contact, to one of said motor circuits or to the other of said motor circuits.

8. In an aircraft propeller structure wherein a propeller hub has a plurality of propeller blades with their roots rotatable in bearings in said hub, and gear trains in said hub, normally nonrotative with respect to said hub for simultaneously rotating said roots, mechanism for operating said gear trains which comprises a pair of axially spaced gears both coaxial with said hub, gearing connecting one of said coaxial gears to the normally nonrotating gears of said gear trains, gearing including a reverse idler pinion set connecting the other of said coaxial gears to the propeller hub, whereby the two coaxial axially spaced gears rotate oppositely, a carrier intermediate said gears and coaxial with said hub, reversing idler pinions on said carrier in mesh with both said coaxial gears, a reversible electric motor connected to said carrier to rotate said carrier, said motor having alternate circuits for changing its direction of rotation, a screw adapted to be rotated by rotation of said carrier, a pitch-indicating carriage internally threaded to fit the threads of said screw, a speed-responsive electric switch having a current supply contact and a contact in communication with each motor circuit alternately engageable with the supply contact as the propeller speed rises or falls, a current source, a manual switch for directing current from said source to said supply contact, and limit switches positioned in the path of said carriage and openable thereby at a predetermined pitch increase or decrease.

9. In an aircraft propeller structure wherein a propeller hub has a plurality of propeller blades with their roots rotatable in bearings in said hub, and gear trains in said hub, normally nonrotative with respect to said hub for simultaneously rotating said roots, mechanism for operating said gear trains which comprises a pair of axially spaced gears coaxial with said hub, gearing connecting one of said axially spaced gears to the normally nonrotating gears of said gear trains, gearing including a reverse idler pinion set connecting the other of said axially spaced gears to the propeller hub, whereby the axially spaced gears rotate oppositely, a carrier intermediate said axially spaced gears and coaxial with said hub, reversing idler pinions on said carrier in mesh with both said axially spaced gears, a reversible electric motor connected to said carrier to rotate said carrier, said motor having alternate circuits for changing its direction of rotation, a screw adapted to be rotated by rotation of said carrier, and a pitch indicator carriage internally threaded to fit the threads of said screw, a current source, a centrifugally operable electric switch having an automatic supply contact, with an automatic pitch increase and an automatic pitch decrease contact alternately engageable with the automatic supply contact as the propeller speed respectively rises or falls, a manual switch comprising a manual supply contact, a manual pitch increase contact and a manual pitch decrease contact, with means to selectively connect the current source to the manual supply contact, the manual pitch increase contact or the manual pitch decrease contact, the manual and automatic supply contacts being in electrical communication, four current carrying conductors, two of them joining the automatic and the manual pitch increase contacts to the motor circuit for pitch increase, and the other two joining the automatic and the manual pitch decrease contacts to the motor circuit for pitch decrease, and pitch change limiting switches, one in each said current carrying conductor positioned in the path of said carriage so as to be opened thereby at a preselected pitch increase or decrease.

10. An adjustable pitch propeller comprising a hub, a blade having its root rotatable in said hub about the blade axis, a pitch-change gear-set in said hub rotatable as a unit with said hub, individual gears of said gear-set being rotatable relative to said hub, said gear-set including a driven gear on the blade root, a control gear coaxial with said hub, and intermediate gears between the control gear and the driven gear, adapted, upon relative rotation of said control gear in one direction, with respect to the hub rotation, to rotate the driven gear for pitch increase, and adapted, upon relative rotation of said control gear in the other direction, with respect to hub rotation, to rotate the driven gear for pitch decrease, a differential gear-set comprising two differential gears with axes coincident with each other and with the hub axis, a differential carrier rotatable about said coincident axes, differential pinions rotatably carried by said differential carrier in mesh with said differential gears, power transmitting means operative upon rotation of said hub in one direction for rotating said differential gears in opposite directions, at least one of said differential gears being drivably connected to said control gear, whereby said differential carrier remains nonrotative when said control gear rotates as one with said hub, and means to rotate said differential carrier in one or the other direction to provide relative rotation in one or the other direction between said control gear and said hub.

11. An adjustable pitch propeller comprising a hub, a blade having its root rotatable in said hub about the blade axis, a pitch-change gear-set in said hub rotatable as a unit with said hub, individual gears of said gear-set being rotatable relative to said hub, said gear-set including a driven gear on the blade root, a control gear coaxial with said hub, and intermediate gears between the control gear and the driven gear, adapted, upon relative rotation of the control gear in one direction, with respect to the hub rotation, to rotate the driven gear for pitch increase, and adapted, upon relative rotation of the control gear in the other direction, with respect to hub rotation, to rotate the driven gear for pitch decrease, a differential gear-set comprising two differential gears with axes coincident with each other and coincident with the hub axis, a differential carrier rotatable about said coincident axes, differential pinions rotatably carried by said differential carrier in mesh with said differential gears, two power transmitting means, one drivably connecting the control gear to one differential gear for unitary rotation, and the second drivably connecting the propeller hub to the other differential gear, a reversing gear included in one of said power transmitting means, whereby, upon unitary rotation of said control gear and said hub in one direction, said differential gears rotate at the same speed in opposite directions, whereby said differential carrier remains nonrotative whenever said control gear rotates as one with said hub, and means to rotate said differential carrier in one or the other direction to provide relative rotation in one or the other direction between said control gear and said hub.

12. In an aircraft propeller mechanism having two close coupled coaxial tandem contrarotating propeller hubs with a plurality of propeller blades in each hub having their roots rotatable in the hubs to change the blade pitch, mechanism for simultaneously rotating the roots of one hub through a slightly greater angle than the roots of the other hub, said mechanism comprising a pair of interfacing gears slightly spaced apart axially, one secured to each hub for unitary rotation therewith, a second pair of interfacing gears, slightly spaced apart axially and surrounding the first pair, a pinion carrier between the two gears of the first said pair of gears, reversing pinion means on said carrier in mesh with both interfacing gears of the first pair, whereby the carrier is held against free rotation, a second reversing pinion means on said carrier rotatable independently of the first pinion means, in mesh with both interfacing gears of the second pair, whereby one of the gears of said second pair may be rotated to rotate the other oppositely, sets of pitch changing gearing, each set having one gear on a blade root, said sets operatively connecting the interfacing gears of the second pair to the blades to the propellers, one set having a higher ratio than the other and so connected to the blade roots that at relatively low pitch the pitch angle of the front and rear blades will be equal, but as a change is made to a higher pitch, the pitch angle of the blades of one hub becomes gradually greater than the pitch angle of the blades of the other hub, and means for rotating one set of the pitch changing gearing while said propeller mechanism is operating.

13. In a dual rotation propeller having two coaxial tandem contrarotating propeller hubs with a plurality of propeller blades in each hub having their roots rotatable in bearings in the hubs to change the blade pitch, gear means for imparting rotation to the roots of the blades of one of the hubs to rotate said blades about the blade axes, and a power transmitting gear train having the driving gear connected to the blade roots of one hub and the driven gear connected to the blade roots of the other hub, said power transmitting gear train being adapted to rotate the blade roots at the driven end of said gear train through a different pitch angle than the blade roots at the driving end of said gear train.

14. In an aircraft propeller mechanism having two adjacent, coaxial, tandem, contrarotating propeller hubs with a plurality of propeller blades in each hub having their roots rotatable in bearings in said hubs, mechanism for simultaneously rotating the roots to alter the pitch of the blades, said mechanism comprising an external spur gear on each hub secured to rotate therewith, a concentric internal spur gear freely rotatable about each external spur gear, one external spur gear and one internal spur gear constituting a pair of gears, a pinion carrier between said pairs of gears, a pair of spur pinions rotatable about their axes on said carrier, a portion of the faces of said spur pinions overlapping and meshing with each other, the remaining portions being extended laterally beyond the carrier and meshed one with each external spur gear, a second pair of spur pinions substantially like the first, except located radially farther from the propeller axis on the carrier and meshed one with each of the internal spur gears, a speed-reducing gear train operatively connecting one of said internal spur gears to the roots of the blades of one propeller, and a second speed reducing gear train operatively connecting the other of said internal spur gears to the roots of the blades of the other propeller, one of said speed reducing gear trains having slightly greater speed reducing capacity than the other.

HOWARD M. McCOY.

Disclaimer 2,389,161.—*Howard M. McCoy*, Fairfield, Ohio. CONTROLLABLE PITCH CHANGE MECHANISM FOR DUAL ROTATION PROPELLERS. Patent dated Nov. 20, 1945. Disclaimer filed July 12, 1948, by the inventor.

Hereby enters disclaimer to claim 13 of said patent.

[*Official Gazette August 10, 1948.*]